(12) United States Patent
Gorman et al.

(10) Patent No.: US 12,416,429 B2
(45) Date of Patent: *Sep. 16, 2025

(54) AIR FILTER AND GASKET FOR THE SAME

(71) Applicant: Camfil AB, Stockholm (SE)

(72) Inventors: Joseph John Gorman, Oak Ridge, NJ (US); Adam Sienkiewicz, Midland Park, NJ (US); Jonathan P. Albar, West Milford, NJ (US)

(73) Assignee: Camfil AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,351

(22) Filed: May 30, 2024

(65) Prior Publication Data

US 2024/0310076 A1    Sep. 19, 2024

Related U.S. Application Data

(63) Continuation of application No. 17/352,106, filed on Jun. 18, 2021, now Pat. No. 12,000,619.

(60) Provisional application No. 63/042,407, filed on Jun. 22, 2020.

(51) Int. Cl.
| | |
|---|---|
| *F24F 13/28* | (2006.01) |
| *B01D 46/00* | (2022.01) |
| *B01D 46/52* | (2006.01) |

(52) U.S. Cl.
CPC .......... *F24F 13/28* (2013.01); *B01D 46/0002* (2013.01); *B01D 46/0005* (2013.01); *B01D 46/001* (2013.01); *B01D 46/521* (2013.01); *B01D 2271/022* (2013.01); *B01D 2271/027* (2013.01)

(58) Field of Classification Search
CPC . F24F 13/28; B01D 46/0002; B01D 46/0005; B01D 46/001; B01D 46/521
See application file for complete search history.

(56) References Cited

U.S. PATENT DOCUMENTS

| | | |
|---|---|---|
| 6,117,202 A | 9/2000 | Wetzel |
| 7,261,757 B2 | 8/2007 | Duffy |
| 9,409,112 B2 | 8/2016 | Wagner et al. |
| 2003/0034279 A1 | 2/2003 | Baltzer et al. |
| 2013/0269531 A1 | 10/2013 | Crabtree et al. |
| 2013/0291502 A1 | 11/2013 | Gorman |
| 2016/0303501 A1 | 10/2016 | Musone |
| 2019/0344208 A1 | 11/2019 | Morgan et al. |

FOREIGN PATENT DOCUMENTS

CN    104039420 A    9/2014

OTHER PUBLICATIONS

Parker Hannifin Corporation 2019, QuadSEAL® Filters MERV 14.
Blue Heaven Technologies, Test Report ANSI/ASHRAE Standard 52.2-20117 Rev. 5-Feb. 27, 2017.
Parker, HVAC Filtration Division, Revision Date Dec. 17, 2018.
International Application PCT/US2021/038123, International Search Report and Written Opinion, dated Sep. 24, 2021, consists of 12 pages.
Brazilian Office Action for Application No. 1120220263910 dated Mar. 25, 2025.

*Primary Examiner* — Robert A Hopkins
(74) *Attorney, Agent, or Firm* — Patterson + Sheridan, LLP (57) ABSTRACT

Disclosed herein are replaceable filter frame gaskets and air filters having the same. The gasket is secured elastically to a filter frame of the air filter, making the gasket easily reusable and removable from the air filter.

15 Claims, 10 Drawing Sheets

AIR FILTER AND GASKET FOR THE SAME

CROSS-REFERENCE TO RELATED APPLICATIONS

This application is a continuation of U.S. Non-Provisional patent application Ser. No. 17/352,106, filed Jun. 18, 2021, which claims benefit of U.S. Provisional Application Ser. No. 63/042,407, filed Jun. 22, 2020, which is incorporated by reference in its entirety.

BACKGROUND OF THE INVENTION

Field of the Invention

Embodiments described herein relate to air handling systems utilizing air filters. More particularly, embodiments described herein relate to air filter gaskets for the same.

Description of the Related Art

Air filtration systems typically utilize various combinations of pre- and primary air filters secured to a holding frame assembly of an air duct or air handlers of an air handling system. The final air filters and prefilters are configured to remove particles from the airstream passing through the air handling systems, such as heating, ventilation and air conditioning system.

Each of the pre- and primary air filters include a filter frame into which filter media is potted, typically in an adhesive. The filter media may be configured as a pleated panel, minipleat, bag filter or arranged in V-bank of pleated panels assembled in a common filter frame. The V-bank air filters are commonly used in air filtration applications where large amounts of filter media are desirable, particularly in high flow, low pressure drop applications. Panel air filters may be used as prefilters or in air filtration applications where large amounts of filter media is not required. The adhesive securing the filter media to the filter frame prevents airflow between the filter media and filter frame, improving particle removal by reducing or removing the amount air by-passing the filter media in the air filter. In many applications requiring high filtration efficiency, a gasket is provided between the filter frame of the air filter and the holding frame assembly of the air filtration system in which the air filter is installed. The gasket prevents airflow between the air filter and holding frame assembly, improving particle removal by reducing or removing the amount air by-passing the air filter.

Conventionally, the gasket permanently is attached into the filter frame. The gasket may be poured-in-place on the filter frame, secured to the filter frame with a pressure sensitive adhesive, molded into, extruded with or otherwise permanently adhered the filter frame such that replacement of the air filter or gasket necessarily requires the replacement of the entire air filter, or for the gasket to be scraped off and the filter frame prepared for another application of the adhesive. On one hand, the service life of the air filter is often much shorter than the service life of the gasket. On the other hand, the gasket may become damaged prior to the expiration of the life of the air filter. In either case, the entire air filter must be replaced when only either the filter media or gasket requires replacement, thus increasing cost of ownership and operation for the air filtration system. Another solution that may be used is to make the gasket permanently adhere to the holding frame. This solution will suffer the same shortcomings as discussed above for permanently adhering the gasket to the filter. I may be an even more disadvantageous solution since the gasket removal will then have to be made on site and often in hard to access locations.

Thus, there is a need for an improved air filter and gasket for the same.

SUMMARY OF THE INVENTION

Disclosed herein is a plurality of embodiments for an air filter having a filter frame and a separate filter frame gasket. The gasket has a rectangular ring shaped body having an inner perimeter, an outer perimeter and corners. A flange extends outward from a first surface of the body extending continuously along an entire length of the body. The gasket additionally has a mating portion extending from a second surface of the body extending continuously along an entire length of the body.

In another embodiment, a filter frame gasket is disclosed. The filter frame gasket has a rectangular ring shaped body. The rectangular ring shaped body has an inner perimeter, an outer perimeter and corners, wherein the corners are homogenously fully formed without a seam or weld. A first flange extends outward from an outer perimeter of the body extending continuously along an entire length of the body.

Other embodiments include an air filter. The air filter includes a filter frame holding filter media within an interior of the filter frame, and a gasket elastically secured to an exterior of the filter frame. In one example, the filter frame has a body. The body may be fabricated a unitary contiguous, single mass of material, or may be assembled from separate component. The body has a plurality of walls coupled together to form a rectangular ring having corners. The walls have an upstream surface, a downstream surface, an outer perimeter and an inner perimeter. Filter media is disposed within the ring of the body, and is very close proximity to or seal against the inner perimeter of the walls. A gasket of single piece construction disposed continuously about the plurality of walls. Alternatively, the gasket may have a seam where ends are joined to form a ring. The gasket has a rectangular ring shaped body. The gasket is secured to the filter frame by elastic compression of the stretched ring shaped body, and/or by compression of the profile of the body within a receiving feature of the filter frame. The rectangular ring shaped body has an inner perimeter, an outer perimeter and corners. A flange extends outward from a first surface of the body extending continuously along an entire length of the body, the flange extending from the outer perimeter of the filter frame and has flange corners homogenously fully formed without a seam or weld.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is contemplated that elements of one embodiment may be beneficially incorporated in other embodiments without further recitation.

DETAILED DESCRIPTION

Embodiments of the invention generally provide a removable gasket mating to the air filter or to the holding frame having a sealing function facing outwards or inwards respectively. In one embodiment, an air filter is provided having a removable gasket. The air filter may be configured as a prefilter, a primary filter, a bag filter, a v-bank filter, or a canister filter, among other types of filter construction. The gasket is elastically secured to an exterior of a filter frame of the air filter. The gasket is ring shaped. The gasket may be fabricated a unitary contiguous, single mass of material, or may have a single seam. The gasket is secured to the filter frame by elastic compression of the stretched ring shaped body, and/or by compression of the profile of the body within a receiving feature of the filter frame. The filter frame secures a filter media within the air filter. In many applications, the air filter is installed in a holding frame assembly when in use. The holding frame assembly is attached to a housing for an air handler or other air moving conduit. The gasket disposed on the filter frame has one or both of the following functionality: the gasket retains the air filter within the holding frame; and/or, the gasket provides a modicum of sealing between the filter frame and the holding frame assembly. In one example, the gasket is molded, co-molded, or otherwise formed as a single continuous piece of material to prevent void slits, seams, opening or other asperities that would compromise the seal along the entire periphery formed by the gasket between the filter frame when disposed in the holding frame assembly. The gasket is independent of and removable from the filter frame to allow for separate reuse and replacement of either the gasket or the filter. In one or more examples, corners of the gasket are shaped to fit in the space formed at the intersection of the corners of the filter frame and the holding frame assembly to prevent voids that air may bypass or leak past the air filter when disposed in the housing. The gasket seals and holds the filter frame in a sealing position within the holding frame assembly, which in many applications desirably eliminates the need for fasteners or other devices to retain the air filter within the holding frame assembly. Below are various embodiments for the gasket in which a number of profiles for the gasket are discussed along with their advantages. Additionally, the examples of the gasket provide for different placement of the gasket on the filter frame.

For the sake of clarity, the holding frame assembly and the filter frame are separate and distinct components. The holding frame assembly is part of the air handler that is permanently installed in a facility, and is not part of the air filter. Once the holding frame assembly is installed in the facility, the holding frame becomes a permanent part of the air handler. Conversely, the filter frame is part of the air filter that is manufactured, shipped and sold as a separate unit from the holding frame assembly. The filter frame is the portion of the air filter that contacts the holding frame assembly when the air filter is removably installed in the holding frame assembly. Although some filter frames have filter media elements that are removable therefrom, such filter frames still comprise the air filter itself, rather than a part of the facility once installed.

Additionally, although the adjective "air" is utilized to describe the filters and filtration equipment disclosed herein, "air" is intended to mean any predominantly gas phase fluid, such as for example, combustion gases, which normally would not be described as "air".

Figure 1:
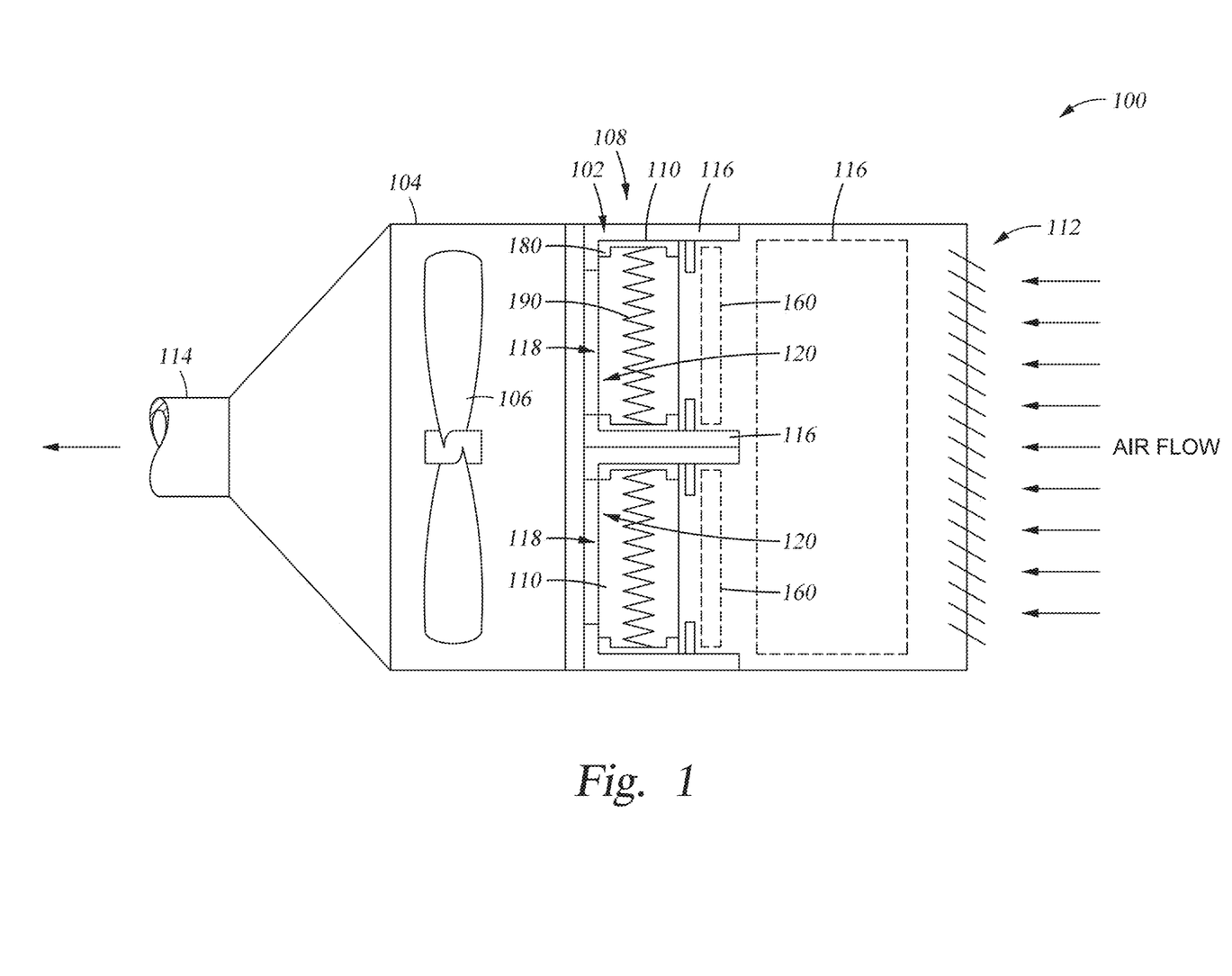
FIG. 1 is a schematic sectional view of an air handler having a holding frame assembly that includes at least one air filter installed therein, with one or more air filters mounted within the holding frame, according to one embodiment of the invention.

FIG. 1 is a schematic sectional view of an air handler 100 having a holding frame assembly 102 installed therein, according to one embodiment of the invention. Although the holding frame assembly 102 is shown mounted inside the air handler 100, it is contemplated that the holding frame assembly 102 may be utilized advantageously in or associated with other air moving conduits and ducts. Although it is contemplated the holding frame assembly 102 may be mounted in the air handler 100, it should be appreciated that the holding frame assembly 102 may be outside the air handler 100. For example, on the outside of a building associated with an air intake for the building there may be a filter holding frame while a fan may be on the other side of the building.

For the sake of simplicity, the disclosure will be discussed with the air handler 100 generally including a housing 104 that contains a blower 106 and the holding frame assembly 102. A filter bank 108 having one or more primary air filters 110 and optionally, one or more prefilters 160 (shown in phantom) are removably mounted to the holding frame assembly 102. The housing 104 may include an access door 122 to facilitate replacement of the primary air filters 110 and/or prefilters 160. The blower 106 draws air into the housing 104 through a grate 112 and through the filter bank 108, exhausting the filtered air from the housing 104 into a conduit 114. The filtered air leaving the air handler 100 through the conduit 114 is typically routed to a facility or other location. Although the blower 106 is shown on the downstream side of the holding frame assembly 102, the blower 106 may alternatively be located in an upstream location.

The holding frame assembly 102 is sealingly coupled to the housing 104 and supports the one or more primary air filters 110 and optional prefilters 160 comprising the filter bank 108. The holding frame assembly 102 may be sealed to the housing 104 by welding, caulking, gaskets, or other suitable methods. Generally, the holding frame assembly 102 includes one or more holding frames 116. The holding frames 116 each having a central aperture 118 and configured to removably hold a single primary air filter 110 and/or associated prefilter 160. The holding frames 116 are fastened, welded or otherwise permanently attached to each other such that the plurality of holding frames 116 permanently comprise part of the filter holding frame assembly 102, and consequently, permanently comprise part of the housing 104 of the air handler 100.

The primary air filter 110 may be configured as a bag filter, a v-bank filter, or a canister filter, a pleated flat panel filter, box filter among other types of filter construction. Although the gasket below is described as utilized with the primary air filter 110, the pre-filter 160 may similarly be configured with a gasket in the same manner for the same purpose. The primary air filter 110 includes filter media 190 disposed in a filter frame 180. The filter media 190 may be a particulate and/or molecular phase (i.e., chemical) filter. In one example, the filter media 190 is has a Minimum Efficiency Reporting Value (MERV) rating of 7 or higher. The filter media 190 may be pleated to increase the surface area available for air passage and increase filtration efficiency of the filter element. For example, the filter media 190 is pleated and has a MERV rating of 7 or higher. In another example, the filter media 190 is a carbon-based chemical filtration media. The filter media 190 directly secured within the filter frame 180 of the primary air filter 110. The filter media 190 may be captured within the geometry of filter frame 180 upon assembly, and/or secured by an adhesive, such as polyurethane to provide an air seal between the filter media 190 and filter frame. The filter frame 180 is comprised of four sides enclosing an open passage in which the filter media 190 is secured. The sides of the filter frame 180 may have a C-shaped profile that accepts the edge of the filter media 190 and may be fabricated from aluminum, sheet metal, plastic, paper (meaning to include paper-like products), wood or other suitable material. In the embodiment depicted in FIG. 1, the filter media has a quadrilateral plane form. In an alternative embodiment, multiple or a singular filter media element may have a single or multiple V shaped and be disposed in a single filter frame 180 to formed what is known in the air filtration industry as a V-bank air filter. In embodiments described herein, an air filter may refer to either the primary air filter 110 or the prefilter 160.

In one embodiment, primary air filters 110 may be one of American Society of Heating Refrigeration and Air Conditioning Engineers (ASHRAE) rated or a Minimum Efficiency Reporting Value (MERV) rated filter, 95% DOP filter, a HEPA filter, or a filter of other efficiency. Other examples of primary air filters 110 that may be utilized with embodiments of the invention include, but are not limited to, 1" deep panel or pleated filters, 2" deep panel or pleated filters, 4" deep panel or pleated filters, 6" or 12" deep rigid filters, headered-style rigid or bag filters and v-bank filters, among others. In one embodiment, the prefilters 160 may be ASHRAE-rated, MERV-rated, EN779-rated, ISO-rated or other suitable first stage filters.

Figure 2A:
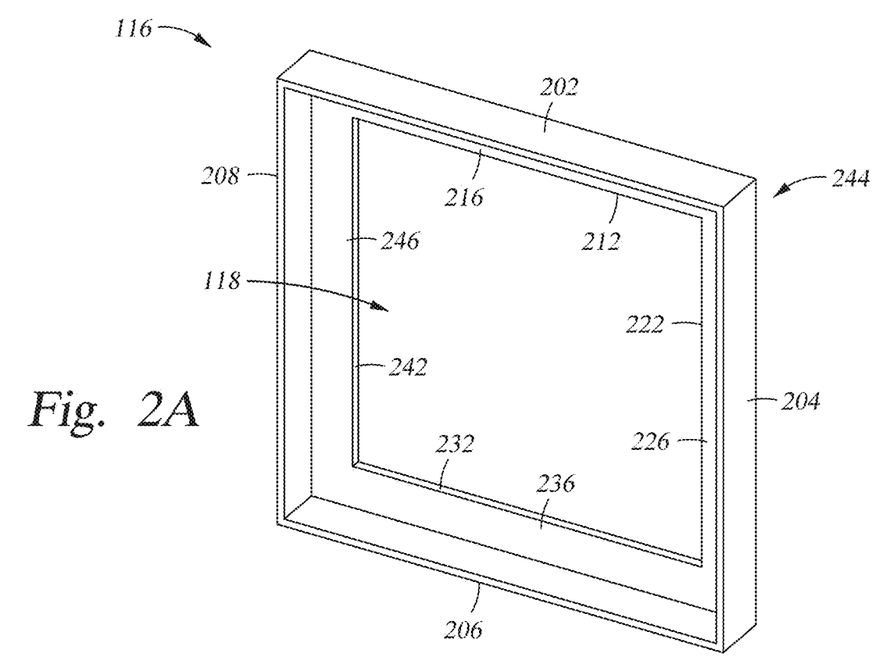
FIGS. 2A-2B depict perspective and front views of the holding frame of FIG. 1.
Figure 2B:
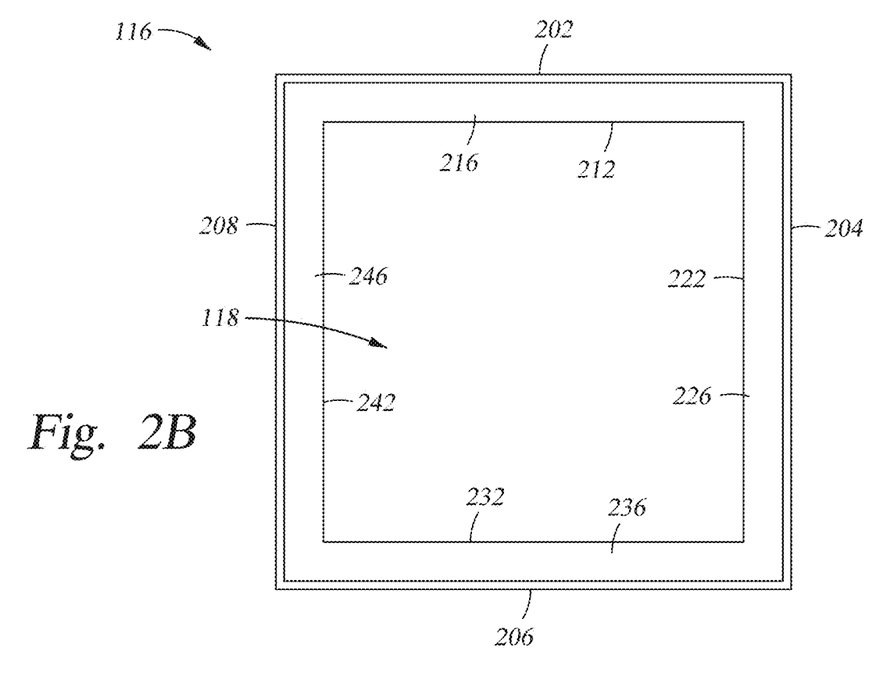

FIGS. 2A and 2B depict a perspective view and a front plane view, respectively, of the holding frame 116 according to one embodiment of the invention. The holding frame 116 includes four I-shaped walls, e.g., a top wall 202, two sidewalls 204, and a bottom wall 206 that are coupled to form a rectangular ring bounding the central aperture 118. In one embodiment, the top wall 202, sidewalls 204, 208 and bottom wall 206 are spaced sufficiently to accept the primary air filter 110 therebetween. The walls 202, 204, 206, 208 also include back flanges 216, 226, 236, 246 that extend inward 90 degrees from the plane of the walls 202, 204, 206, 208 and terminate at open edges 212, 222, 232, 242 that define the central aperture 118 of the holding frame 116. The walls 202, 204, 206, 208 and back flanges 216, 226, 236, 246 may be fabricated from a single or multiple elements. The back flanges 216, 226, 236, 246 provides a surface for the primary air filter 110 to abut when installed into the holding frame 110, while aperture 118 defined by the open edges 212, 222, 232, 242 is sized to prevent the filter 110 from passing through the holding frame 116 while not interrupting air flow through the air filter 110. It should be noted that other angles than 90 degrees between the walls and back flanges may be used and the wall and back flanges may have slightly different shapes as long as they form a sealable and secure mount for the air filters. Additionally, it should be appreciated that the air filter 110 may be disposed on either an upstream or downstream face of the back flanges 216, 226, 236, 246.

For the sake of clarity, embodiments of the invention are described in relation to a direction of airflow, for example, such as the air flow shown in FIG. 1. Further, the terms "upstream" and "downstream" may be used herein to describe the arrangement and configuration of components of embodiments of the invention relative to such a directional airflow (e.g., "downstream side"). However, it is contemplated that embodiments of the invention may be configured to be suitable for use with a "reversed" or opposite direction of airflow. As such, it is understood that such terms as "downstream" or "upstream" do not in any way limit or restrict embodiments of the invention or manners in which embodiments of the invention may be utilized, but rather, provide clarification for the arrangement and configuration of said components relative to one exemplary direction of air flow.

Figure 3A:
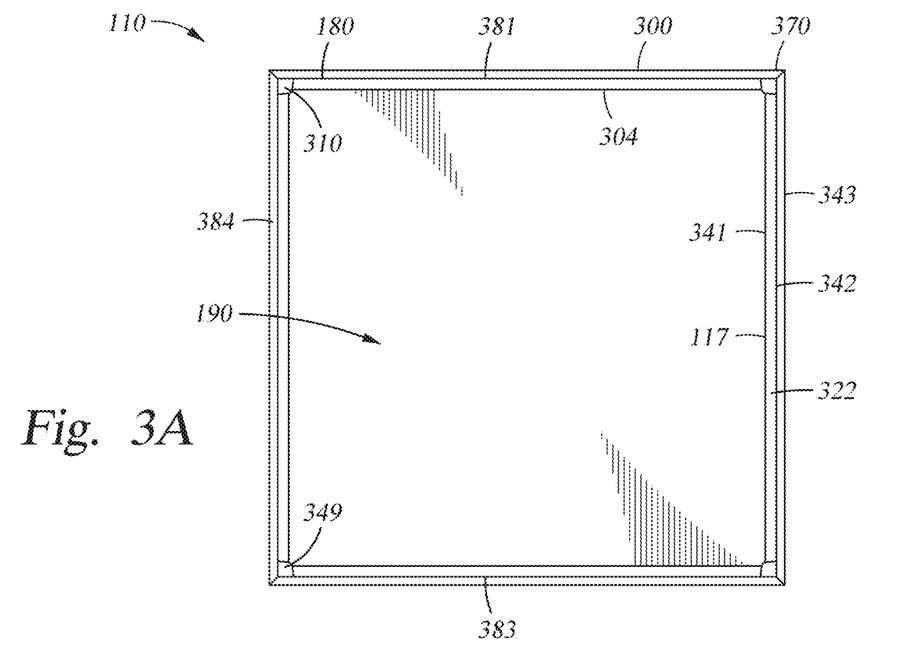
FIG. 3A is a plan view of an upstream side of an air filter having a removable gasket.

FIGS. 3A through 3D detail an air filter, such primary air filter 110 among others, having a replaceable gasket 300. For example, the gasket 300 may be separately attached to the filter frame 110. The gasket 300 may be glued, over-molded, or otherwise attached to the filter frame 110 in a semi-permanent or permanent manner. Alternately, the gasket 300 may be attached to the filter frame 110 in an elastomeric fashion or with attachment features allowing the gasket 300 to be removed from the filter frame 100. For example, a damaged gasket 300 may be removed from the filter frame and replaced with a new gasket 300. The filter frame 110 is rectangular and may have a length of between about 300 mm to about 610 mm and even over about 1200 mm on any one side. For example, the filter frame 110 may be about 300 mm by about 300 mm, about 1 ft by about 1 ft, about 1 ft. by about 2 ft., about 2 ft. by about 2 ft. and even about 4 ft. by about 4 ft. However, it should be appreciated that the filter frame 110 may be any suitable large size for an air handling system. Herein after, the primary air filter 110 is referred to as air filter 110. Each figure will be introduced individually for better clarity. FIG. 3A is a plan view of an upstream side of the air filter 110 illustrating the filter frame 180 and filter media 190. Note that the air filter 110 is orientated 90 degrees relative to the illustration of FIG. 1. The filter frame 180 has a body 117. The walls 304 of the body 117 has an inner surface 341 and an outer perimeter 342. The walls 304 of the body 117 may have four walls, such as a first wall 381, a second wall 382, a third wall 383 and a fourth wall 384. The walls 304 of the body 117 meet at a respective outer-most corner 349 along the outer perimeter 342 of the body 117. The outer-most corners 349 define the outer-most extent of the filter frame 180. In some examples, the filter frame 180 has recesses 310 disposed at the outer-most corners 349.

Figure 3B:
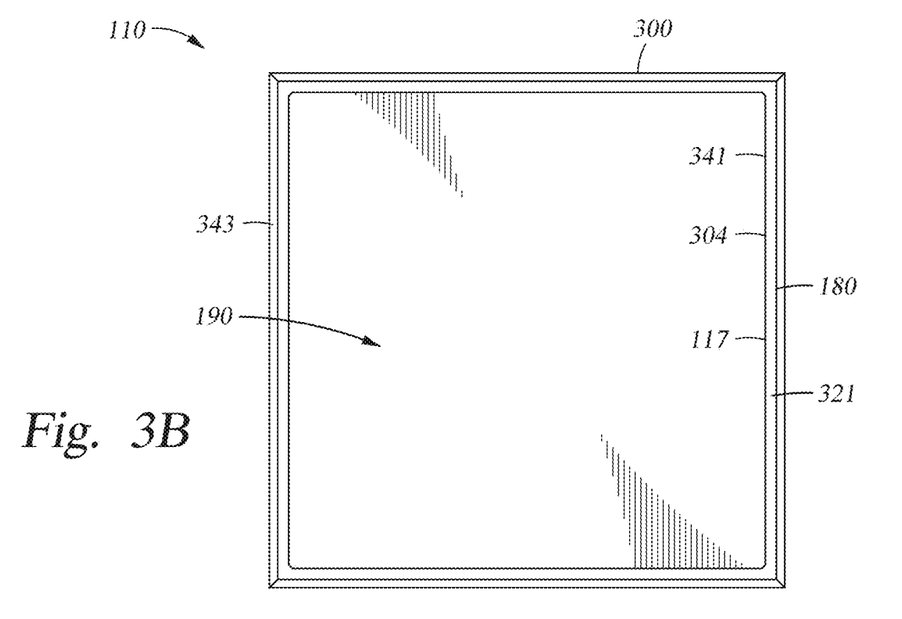
FIG. 3B is a plan view of a downstream side the air filter of FIG. 3A.

FIG. 3B is a top plan view of the air filter 110 of FIG. 3A. Referring to both FIGS. 3A and 3B, the body 117 of the filter frame 180 additionally has a downstream surface 321 and an upstream surface 322. The filter media 190 is disposed between the upstream surface 322 and the downstream surface 321. The gasket 300 is removable disposed on the filter frame 180. By removably disposed, it is meant that the gasket 300 is secured to the filter frame 180 without the use of adhesives. In particular, the gasket 300 is elastically secured the filter frame 180. By elastically secured, it is meant that the gasket 300 is secured to the holding by elastic compression of the profile of gasket 300, and/or by compression of the ring shape form of the gasket 300 stretched around the perimeter of the filter frame 180. The gasket 300 may be disposed on the downstream surface 321 or around the outer perimeter 342 of the filter frame 180. When installed, the perimeter of the gasket 300 is greater than the perimeter of the filter frame 180. The gasket 300 has an outer edge 343 that extends beyond the outer perimeter 342 of the body 117 of the filter frame 180. In this manner, the gasket 300 forms a seal between the filter frame 180 of the air filter 110 and the holding frame 116 of the holding frame assembly 102. Thus when the air filter 110 is installed in the holding frame 116, air passes through the filter media 190 of the air filter 110 instead of by-passing the air filter 110 through a gap formed between the air filter 110 and the holding frame 116.

Figure 3C:
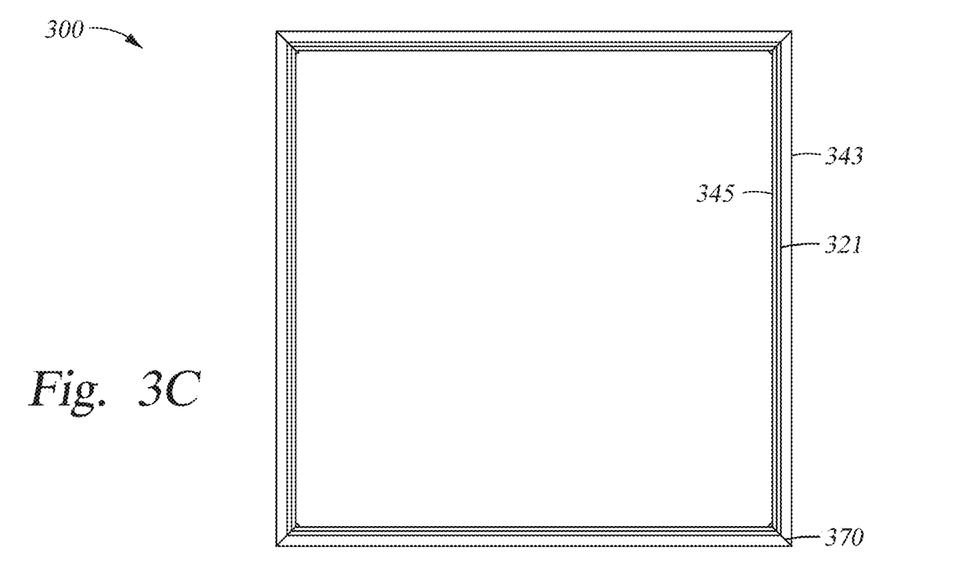
FIG. 3C is a top plan view of the gasket of FIG. 3A.

FIG. 3C illustrates a top plan view of one example of the gasket 300 suitable for use with the filter frame 180 of the air filter 110. The gasket 300 may be configured in a number of different profiles, some of which are described below with reference to FIGS. 4A through 4F, FIGS. 5A through 5C, FIGS. 6A through 6B, and additionally in FIG. 7. The gasket 300 has a top surface 351, an outer perimeter 343, an inner perimeter 345 and a bottom surface (shown in FIG. 3D using reference numeral 352). When installed to the filter frame 180, the inner perimeter 345 faces the filter media 190, while the outer perimeter 343 extends beyond the outer perimeter 342 of the holding frame 116. In one example, the inner perimeter 345 of the gasket 300 is at least 1200 mm. The gasket 300 is formed from an elastomeric material. Suitable elastomeric materials include high-density foam rubber and similar materials. In another example, the gasket 300 is formed from an elastomeric material permitting the inner perimeter 345 of the gasket 300 to expand to at least 1200 mm.

Figure 3D:
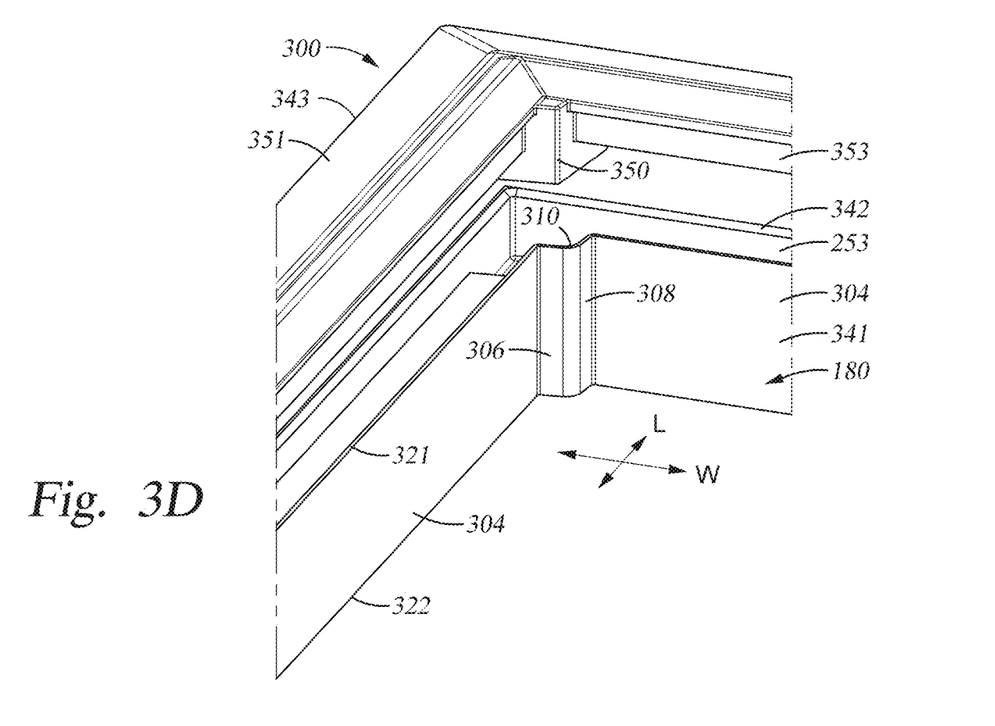
FIG. 3D is a perspective view of the gasket interfaced with the filter frame of the air filter depicted in FIG. 3A.

FIG. 3D is a perspective view of one example of an interface between the gasket 300 and the filter frame 180 of the air filter 110. The filter media 190 is not shown in FIG. 3D, but is present and surrounded by the filter frame 180 of the air filter 110. In some examples, the gasket 300 has a mating portion 353 along the bottom surface 352. The mating portion 353 extends around the entire perimeter of the gasket 300. The mating portion 353 has an inner wall, and outer wall, and a bottom. The gasket 300 also has corners 370 where each of the sides meet, thus forming the rectangular ring shape of the gasket 300. The corners 370 are illustrated in the figures with a line where the top surface 351 of the gasket 300 changes direction to follow the walls 304 of the filter frame 180. However, it should be understood that the line is not a seam but a change in angle at the corners 370. That is, the corners 370 are continuous of homogenous material and not welded, glued or otherwise seamed together. Inside of the corners 370 of the gasket 300, a key 350 may be formed along the bottom surface 352 and/or the inner perimeter 345, and project into the interior region circumscribed by the gasket 300. Although the key 350 is shown as a rectangle it should be appreciated the key may be oval or any other suitable shape. The mating portion 353 meets at the key 350 in the corners 370 of the gasket 300.

In one example, the gasket 300 is formed continuously without joints or seams. For example, the corner 370 of the gasket 300 is not welded or otherwise discontinuous so that air leakage is substantially prevented. Furthermore, the gasket 300, when formed as a single one piece seamless member, small radius, a sharp corners, or other profiles may be utilized to maximize contact between the gasket 300 and the holding frame assembly 102 for forming substantially airtight seal along the outer corners 349 of the filter frame 180. The gasket 300 is continuous with no joints or seams and provides sealing around entire filter frame 180. In an alternative example, the gasket 300 may include joints or seams, but not at the outer corners 349, and may be made from multiple segments. In other examples, the gasket 300 may include joints or seams at the outer corners 349, although such configurations increase the risk of leakage.

The filter frame 180 has a channel 253, or slot, in which the mating portion 353 of the gasket 300 is configured to interface. The key 350 of the gasket 300 is configured to interface and mate with the recesses 310 of the filter frame 180. The recesses 310 of the filter frame 180 may be any shape, such as cylindrical or rectangular, and provide a location points for the key 350 to fix and orientate the gasket 300 to the filter frame 180. The key 350 and mating recess 310 also help prevent the gasket 300 from rotating on the filter 110, which may create particular and damage the gasket 300, but also prevent the gasket 300 from being installed in a backwards directions, which may promote leakage and/or allow the filter 110 to undesirably move within the filter frame 180. The mating portion 353 and the key 350 have a different cross-section profile, i.e., the key 350 has a larger cross-section profile than the mating portion 353. The different cross-sectional profile ensures the key 350 only fits in the recess 310 and preventing the key 350 from extending into the channel 253.

The key 350 of the gasket 300 may have a length and width substantially similar to that of the recess 310 so as to form a tight fit between the key 350 and the recess 310. Similarly, the channel 253 may be substantially the same size and shape as the mating portion 353 such that a tight fit is formed between the mating portion 353 and the channel 253 when the mating portion 353 is inserted in the channel 253. It should be appreciated, when the mating portion 353 is inserted in the channel 253 and the key 350 is inserted in the recess 310, the gasket 300 is held firmly in place on the filter frame 180. With the gasket 300 firmly in place on the filter frame 180, a substantially airtight seal is formed between the gasket 300 and the filter frame 180. Advantageously, the gasket 300 can be easily removed from the filter frame 180, and replaced or even reused as desired. However, it should also be appreciated that the gasket 300 described herein may be glued to the filter frame 180 with a low strength adhesive. Such a gasket 300 may optionally forgo the mating portion 353 and key 350 for retaining the gasket 300 in the filter frame 180.

As illustrated in FIG. 3D, the gasket 300 is disposed on the downstream surface 321 of the filter frame 180. The channel 253 disposed on the downstream surface 321 of the filter frame 180. In other examples, the gasket 300 is disposed on the upstream surface 322 of the filter frame 180. The channel 253 disposed on the upstream surface 322 of the filter frame 180. It is contemplated that the filter frame 180 may have more than one channels 253 for example disposed on both the upstream surface 322 and the downstream surface 321 of the filter frame 180. It should also be appreciated that the gasket 300 may alternately be stretched around the outer perimeter 342 of the filter frame 180, such that the elastic compression of the gasket 300 holds the gasket 300 in place on the outer perimeter 342 of the filter frame 180. In either configurations, the gasket outer edge 343 extends beyond the outer perimeter 342 of the filter frame 180 for forming a seal in the holding frame assembly 102. Here, the channel 253 may optionally be disposed on the outer perimeter 342 of the filter frame 180. In one embodiment the filter frame 180 has channels 253 disposed on both the upstream surface 322 and the downstream surface 321 as well as the outer perimeter 342 of the filter frame 180. Advantageously, the filter frame 180 may have channels 253 mirrored on both sides of the filter frame 180 which permits the gasket 300 to be installed on either side.

Figure 4A:
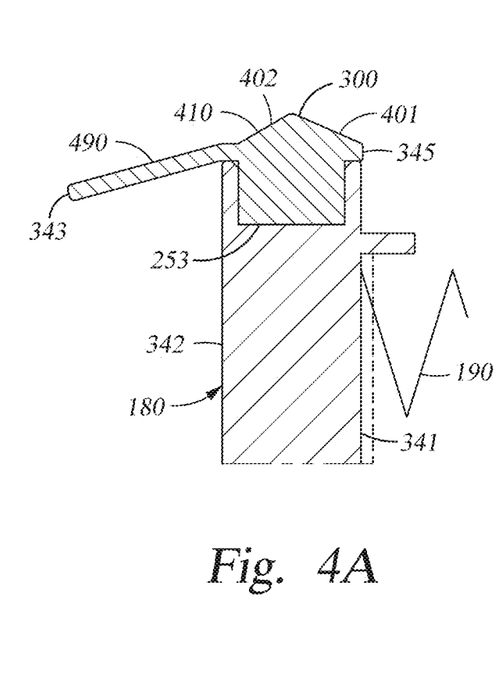
FIG. 4A is a partial cross-sectional profile illustrating a first example of an interface between the gasket and the filter frame of the air filter of FIG. 3A.

The gasket 300 may have a variety of alternative profiles, some of which are shown in FIGS. 4A-5A. FIG. 4A illustrates a first cross-sectional profile of the gasket 300. The gasket 300 includes a ring shaped body 410. The body 410, shown in cross-sectional profile, has a rectangular mating portion 353 configured to fit in the channel 253 of the filter frame 180. Extending above the downstream surface 321 of the filter frame 180, a first angled surface 401 extends from inner perimeter 345 to a peak 303. The peak 303 is the most distal extent of the body 410 above the downstream surface 321 of the filter frame 180. The peak is configured to extend about 0.1 inches to about 0.2 inches about the filter frame 180. A second angled surface 402 extends from the peak 303 to a flat surface extending to the outer perimeter of the filter frame 180. A flange 490 of the body 410 extends downward to the outer perimeter 343 of the gasket 300 from the second angled surface 402. The flange 490 may have a length of 0.5 in or more. The flange 490 extends outward from the outer perimeter 342 to form a sealing feature. The flange 490 has a thickness between 0.025 inches and about 0.100 inches and has a length of between about 0.3 inches and about 1.00 inches. The flange 490 is configured to be angled between 45 degrees and 90 degrees from the outer perimeter 343 of the perimeter of the filter frame 180, such as between about 70 degrees and about 80 degrees. The angle of that flange relative to the body, i.e., down and away from top surface, is longer than the body is wide to promote flexibility which promotes sealing and provides more forgiving wider tolerance. In one embodiment, the flange 490 may have one or more barbs 491, a flap, serrations or other features extending therefrom. The barbs 491 aids in engaging the holding frame 116 and forming the seal when the flange 490 is compressed and or bent as the filter frame 180 is installed in the holding frame 116. Advantageously, the gasket 300 has two sealing surfaces with one formed at the peak 303 and the other formed at the outer perimeter 343, or flange 490, for making a substantially air airtight seal. The gasket 300 can be made fairly rigid and solid for longevity, while minimizing excess material.

Figure 4B:
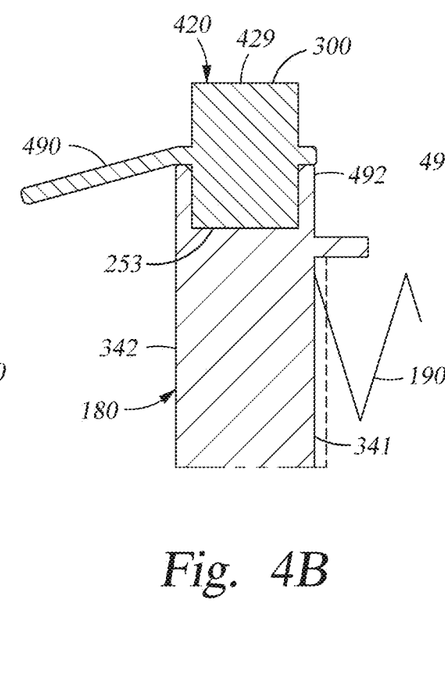
FIG. 4B is a partial cross-sectional profile illustrating a second example of an interface between the gasket and the filter frame of the air filter of FIG. 3A.

FIG. 4B illustrates an alternative cross-sectional profile of the gasket 300. The gasket 300 has ring shaped body 420. The body 420 has a flange 490 that is substantially similar to that discussed with respect to FIG. 4A. The body 420 has a rectangular mating portion 353 configured to fit in the channel 253 of the filter frame 180. The body 420 has an inner flat surface 492 that helps to stabilize the gasket 300 on the downstream surface 321 of the filter frame 180. Extending above the downstream surface 321 of the filter frame 180 is a portion of the body 420 that is substantially rectangular in shape. The body 420 has a top surface 429 that forms the sealing surface. The top surface 429 of the body 420 is substantially flat. The top surface 429 the body 420 may be parallel to the downstream surface 321 of the filter frame 180. Advantageously, the gasket 300 has two sealing surfaces, one at the top surface 429 the body 420 and other at the outer perimeter 343 for making an air airtight seal. The gasket 300 can be made rigid and solid for longevity to promote reuse.

Figure 4C:
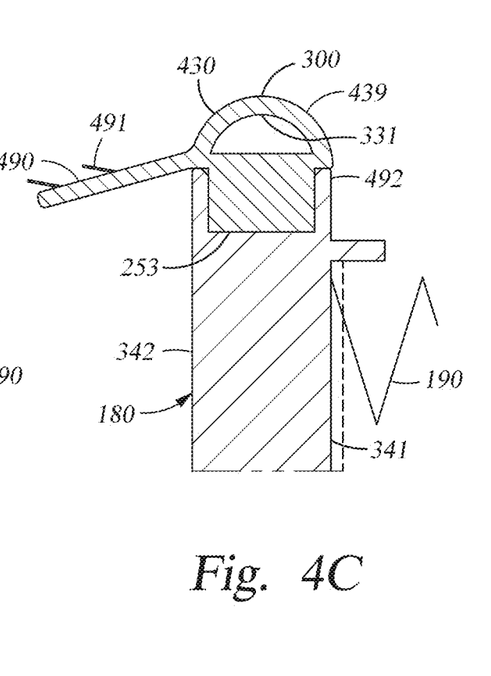
FIG. 4C is a partial cross-sectional profile illustrating a third example of an interface between the gasket and the filter frame of the air filter of FIG. 3A.

FIG. 4C illustrates another alternative cross-sectional profile of the gasket 300. The gasket 300 has a body 430. The body 430 has a rectangular mating portion 353 configured to fit in the channel 253 of the filter frame 180. The mating portion 353 may extend between about 0.15 inches to about 0.5 inches into the channel 254. The body 430 has an inner flat surface 492 that helps to stabilize the gasket 300 on the downstream surface 321 of the filter frame 180. The body 430 has a flange 490 that is substantially similar to that discussed with respect to FIG. 4A. The body 430 has a rounded top surface 439. The rounded top surface 439 extends from the inner flat surface 492 to the flange 490. The body 430 has a hollow 311 disposed below the rounded top surface 439 and above the rectangular mating portion 353. The hollow 311 is fully enclosed to an interior of the body 430. The hollow 311 allows the rounded top surface 439 of the body 430 to be compressed for easier installation of the air filter 110 into the holding frame assembly 102, while forming a good seal between the filter frame 180 and the holding frame 116. Advantageously, the gasket 300 has two sealing surfaces, one at the rounded top surface 439 the body 430 and other at the outer perimeter 343 of the gasket 300 for making a substantially air airtight seal. The flange 490 also provides stability and holds the filter into the holding frame 116.

Figure 4D:
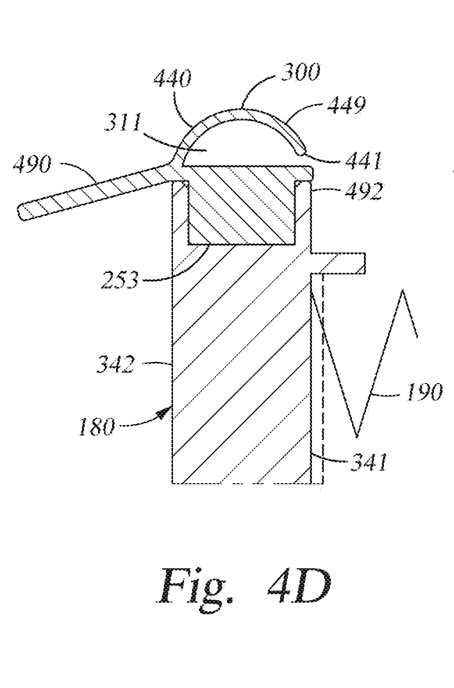
FIG. 4D is a partial cross-sectional profile illustrating a fourth example of an interface between the gasket and the filter frame of the air filter of FIG. 3A.

FIG. 4D illustrates another alternative cross-sectional profile for the gasket 300. The gasket 300 has a ring shaped body 440. The body 440 has a rectangular mating portion 353 configured to fit in the channel 253 of the filter frame 180. The body 440 has a flange 490 that is substantially similar to that discussed with respect to FIG. 4A. The body 440 has an inner flat surface 492 that helps to stabilize the gasket 300 on the downstream surface 321 of the filter frame 180. The body 440 has a rounded top surface 449. The rounded top surface 449 extends from the flange 490 toward the inner flat surface 492. A gap 441 is provided between the rounded top surface 449 and the inner flat surface 492 such that the rounded top surface 449 does not extend all the way to the inner flat surface 492. The body 440 has a hollow 311 disposed in an interior of the body 440 below the rounded top surface 449 and above the rectangular mating portion 353. The hollow 311 is exposed to an exterior portion of the body 430 through the gap 441. The hollow 311 allows the rounded top surface 449 of the body 430 to be compressed for easier installation of the filter frame 180 and forming a good seal. The gap 441 allows air to escape the hollow 311 upon installation of the air filter 110 in the holding frame 116, making for a more compliant and robust seal. Advantageously, the gasket 300 has two sealing surfaces, one at the rounded top surface 449 of the body 430 and the other at the outer perimeter 343 or the flange 490.

Figure 4E:
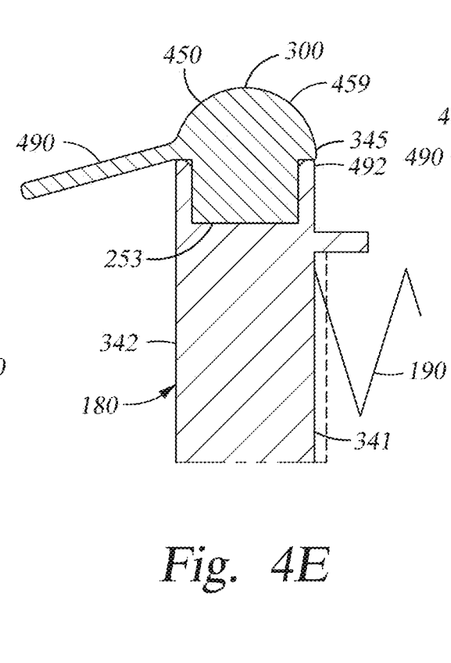
FIG. 4E is a partial cross-sectional profile illustrating a fifth example of an interface between the gasket and the filter frame of the air filter of FIG. 3A.

FIG. 4E illustrates another cross-sectional profile for the gasket 300. The gasket 300 has a ring shaped body 450. The body 450 has a rectangular mating portion 353 configured to fit in the channel 253 of the filter frame 180 The body 450 has a flange 490 that is substantially similar to that discussed with respect to FIG. 4A. The body 450 has an inner flat surface 492 that helps to stabilize the gasket 300 on the downstream surface 321 of the filter frame 180. The body 450 has a rounded top surface 459. The rounded top surface 459 extends fully from the flange 490 to inner perimeter 345 of the gasket 300. The body 450 is solid throughout. Advantageously, the gasket 300 has two sealing surfaces, one at the rounded top surface 459 the body 430 and the other at the outer perimeter 343 and/or the flange 490.

The material and profile selection for the gasket 300 facilitates deflection of the gasket 300 during the installation of the air filter 110 into the holding frame 116 and compression of the gasket 300 for securing the filter 110 into the holding frame assembly 102, while requiring no secondary mechanical fasteners. The gasket 300 deflects during filter installation to seal the air filter 110 to the holding frame assembly 102. Additionally the gasket 300 forms a continuous ring around the entire the outer perimeter 343 of the perimeter of the filter frame 180, including the outer corners 349, so that potential air by-pass is minimized.

Figure 4F:
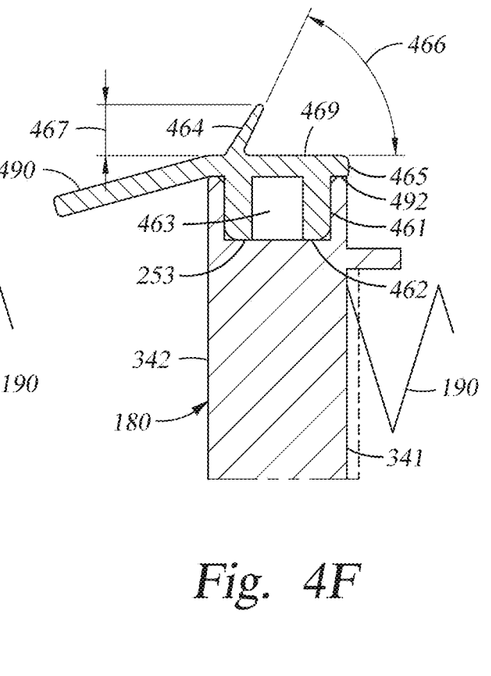
FIG. 4F is a partial cross-sectional profile illustrating a sixth example of an interface between the gasket and the filter frame of the air filter of FIG. 3A.

FIG. 4F is a partial cross-sectional profile illustrating a sixth example of an interface between the gasket 300 and the filter frame 180 of the air filter 110 of FIG. 3A. The gasket 300 has a ring shaped body 460. The body 460 has a rectangular mating portion 353 configured to fit in the channel 253 of the filter frame 180. The body 460 has a flange 490 that is substantially similar to that discussed with respect to FIG. 4A. The body 460 has an inner flat surface 492 along an interior edge 465 of the gasket 300 that helps to stabilize the gasket 300 on the downstream surface 321 of the filter frame 180. The body 460 has a flat top surface 469. The flat top surface 459 has a protrusion 464 extending from the flat top surface 459 at or near the flange 490. The flat top surface 469 extends from the protrusion 464 to the interior edge 465 of the gasket 300. The protrusion 464 extends away from the flat top surface 469 at an angle 466 towards the interior edge 465. The angle 466 of the protrusion 464 determines a height 467 the protrusion 464 extends above the flat top surface 469. The angle 466 of the protrusion 464 may be between 90 degrees and about 30 degrees such as 60 degrees.

The body 460 is formed by a plurality of elements arranged in a ladder type fashion in the rectangular mating portion 253. The rectangular mating portion 253 has an outer wall 462 connected to an inner wall 461 by a plurality of cross members 463 (the front of one of which is shown in the sectional view of FIG. 4F). The plurality of cross members 463 may be substantially orthogonal to the outer wall 462 and the flat top surface 469. The plurality of cross members 463 may additionally be substantially orthogonal to the inner wall 461. The plurality of cross members 463 may be spaced apart to form hollows therebetween or a ladder structure in the rectangular mating portion 253. Alternately, the cross members 463 may have any suitable geometry, such as that of a honeycomb structure below the flat top surface 469 and forming the rectangular mating portion 253, that allows the minimization of the amount of material used to reach maximum stiffness with minimal weight and material cost. In one example, the outer wall 462, the plurality of cross members 463, and the inner wall 461 form a ladder structure in the bottom of the rectangular mating portion 253. The ladder structure also depicted in FIG. 8B.

Continuing to refer to FIG. 4F, the gasket 300 advantageously has two sealing surfaces, one at the protrusion 464 and one at the flange 490. The material and profile selection for the gasket 300 facilitates deflection of the gasket 300 during the installation of the air filter 110 into the holding frame 116 and compression of the gasket 300 for securing the filter 110 into the holding frame assembly 102, while requiring no secondary mechanical fasteners. Additionally, the array of elements forming the mating portion 253 reduces the of material resulting in a cost savings while additionally allowing the mating portion 253 to be compressed for easy installation. The gasket 300 deflects during filter installation to seal the air filter 110 to the holding frame assembly 102. Additionally the gasket 300 forms a continuous ring around the entire the outer perimeter 343 of the perimeter of the filter frame 180, including the outer corners 349, so that potential air by-pass is minimized.

Figures 5A, 5B:
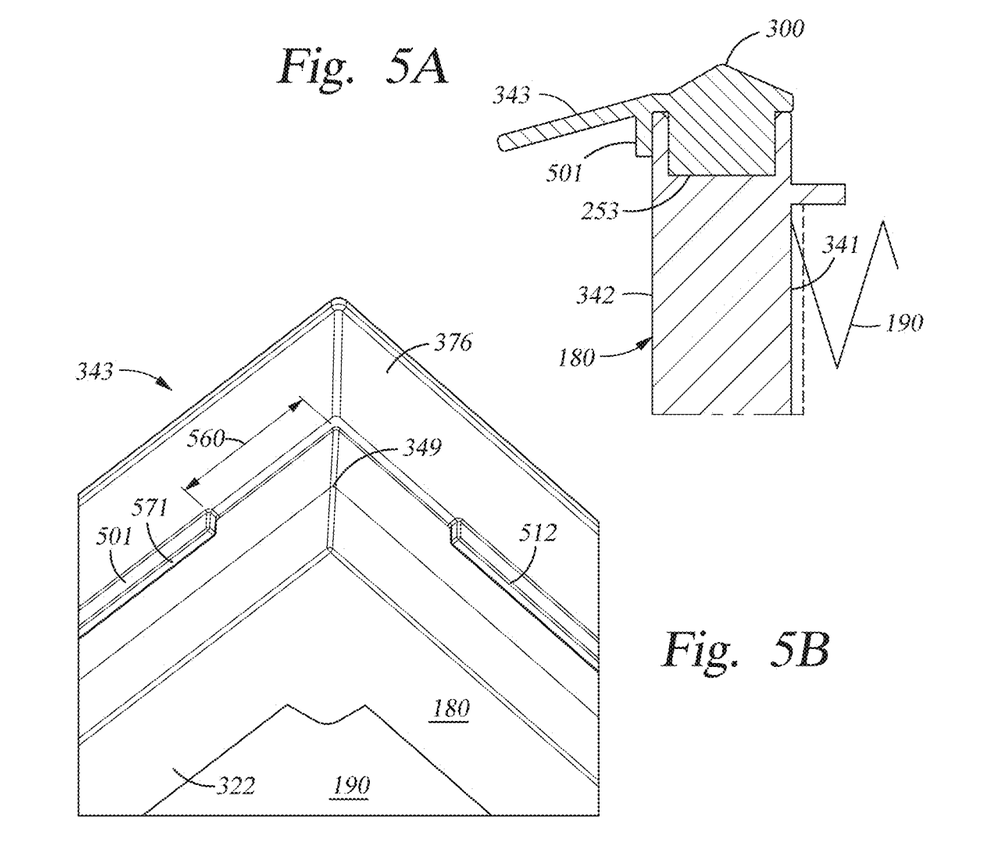
FIG. 5A is a partial cross-sectional profile of an air filter having a removable gasket stretched around a periphery of a filter frame of the air filter.
FIG. 5B is a perspective view of an example corner configuration for the outside rib of the gasket of FIG. 5A.

FIG. 5A illustrates yet another cross-sectional profile for the gasket 300. The gasket 300 has a ring shaped body 510 having an outwardly extending flange 490. The gasket 300 has an outside rib 501 extending from a bottom of the flange 490 immediately adjacent to the flat surface of the body 510. The downstream surface 321 of the filter frame 180 is configured to insert into a slot formed between the body 510 and the outside rib 501 to assist securing the gasket 300 to the filter frame 180. Although gasket 300 is shown in cross-section to be substantially similar to that of gasket 300 shown in FIG. 4A, it should be appreciated that the gasket 300 illustrated in FIG. 5A may have other cross-sectional profiles, such as but not limited to as shown in FIGS. 4A through 4F. The gasket profiles illustrated in FIGS. 4A through 4F may optionally include an outside rib 501. The outside rib 501 is configured to prevent the gasket 300 from rolling out or off of the filter frame 180 and help secure the gasket in place while there is a moment force applied to the flange 490 during installation of the filter frame 180.

Figure 5C:
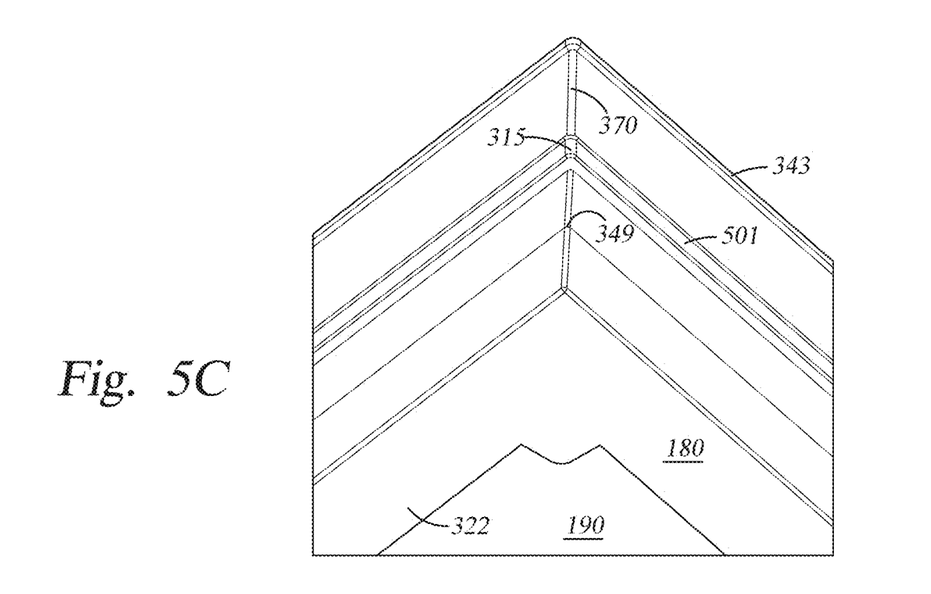
FIG. 5C is a perspective view of another example corner configuration for the outside rib of the gasket of FIG. 5A.

The outside rib 501 is spaced apart from the rectangular mating portion 353 such that a portion of the filter frame 180 is sandwiched between them. The outside rib 501 may be in direct contact with the filter frame 180 when the rectangular mating portion 353 is in the channel 253 of the filter frame 180. The outside rib 501 may be rectangular in shape, oblong, triangular or any shape such that a flat of the outside rib 501 is adjacent the outer perimeter 342 of the filter frame 180. The outside rib 501 may be continuous around the length of the gasket 300. Alternately, the outside rib 501 may be formed of segments 571, 572, such as four or more segments. FIGS. 5B and 5C illustrate the outside rib in the corner section that may not necessarily be indicative of the continuous nature of the outside rib 501 as the outside rib 501 in some examples may only be in the corner for holding the gasket 300 firmly in place in the filter frame 180. In some examples having the outside rib 501 in the corners 370, the gasket 300 may forgo the inclusion of the key 350 for holding the gasket 300 in place in the filter frame 180.

FIG. 5B illustrates a perspective view of an example corner configuration for the outside rib 501 of the gasket 300 of FIG. 5A. The outside rib 501 does not extend completely to the corner 370 of the gasket 300. The outside rib 501 may extend to a distance 560 from the outer corner 349 of the filter frame 180. The outer corner 349 additionally aligns with the corner 370 of the gasket 300. The distance 560 may be between about 1 mm to about 50 mm or more. The outside rib 501 having the distance 560 from the outer corner 349 of the holding frame 116 permits the gasket 300 to be installed more easily while still having the benefit of the outside rib 501 for stabilizing and fixing the gasket 300 to the filter frame 180.

FIG. 5C illustrates a perspective view of another example corner configuration for the outside rib 501 of the gasket 300 of FIG. 5A. The outside rib 501 extends completely to the corner 370 of the gasket 300 and likewise the outer corner 349 of the filter frame 180. Thus, a rib corner 515 is formed where the outside rib 501 on adjacent sides, i.e., walls 202, 204, 206, 208, of the filter frame 180 meet. The rib corner 515 is continuous of homogenous material and not welded, glued or otherwise seamed together. The outside rib 501 permits the gasket 300 to be tightly secured to the filter frame 180. Additionally, the outside rib 501 having the rib corner 515 is less prone to damage when the gasket 300 is being installed on the filter frame 180.

Figure 6A:
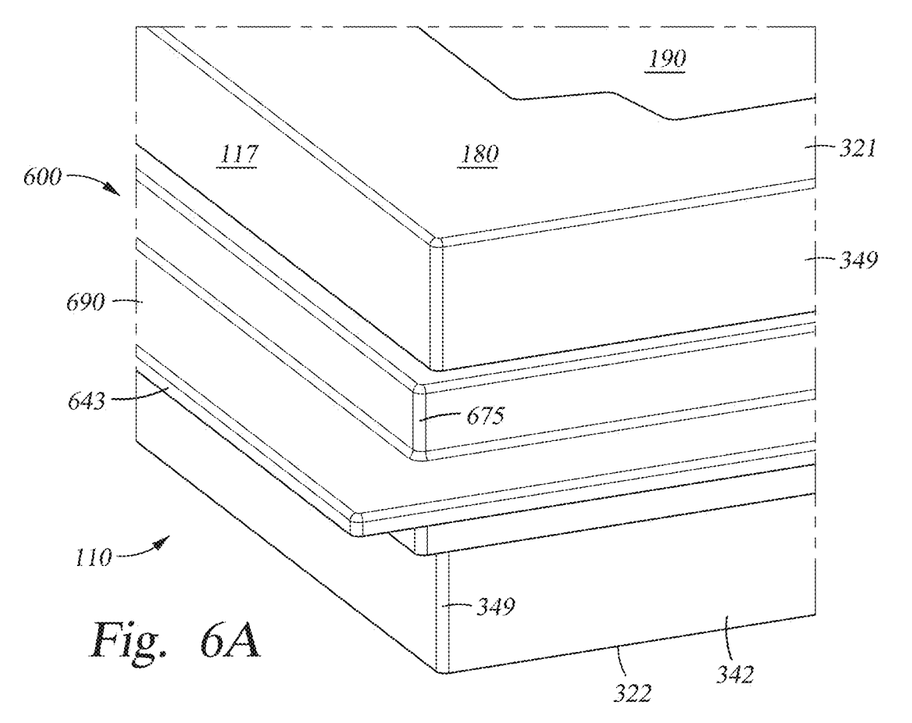
FIG. 6A is a partial perspective view of an air filter having another example of a gasket stretched around a periphery of a filter fame of the air filter.
Figure 6B:
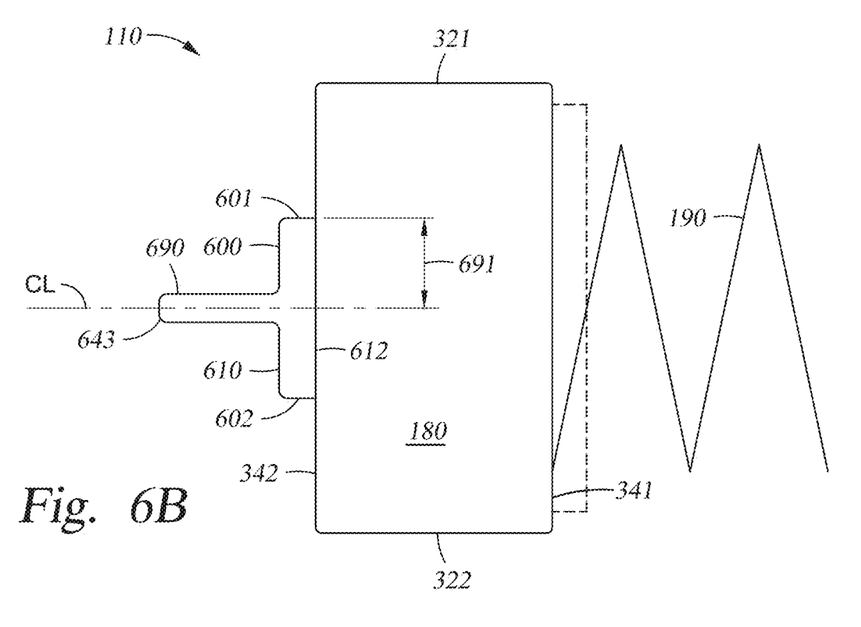
FIG. 6B is a partial cross-sectional view of the gasket shown in FIG. 6A.

It should be appreciated that the gasket, substantially similar in purpose to gasket 300, may also reside on the outer perimeter 342 of the filter frame 180. FIG. 6A illustrates a perspective view of an example gasket 600 disposed on the outer perimeter 342 of the filter frame 180. FIG. 6B illustrates a cross-sectional view of one example of the gasket 600 shown in FIG. 6A. The gasket 600 has a T-shaped profile and a ring shaped body 610 that is stretched over the filter frame 180 so the elastic compression of the ring retains the gasket 300 on the exterior perimeter of the filter frame 180. The T-shaped body 610 has a central flange 690 extending from a base portion 612 of the body 610. It should be appreciated that the central flange 690 may bisect the base portion 612 of the body 610. It should also be appreciated that the central flange 690 may be offset from a centerline bisecting the base portion 612 of the body 610. The base portion 612 is configured to be disposed on the outer perimeter 342 of the filter frame 180. For example, a distance 691 from a first end 601 to a centerline bisecting the central flange 690 may be more or less than a distance from the centerline to a second end 602 of the base portion. A distal end 643 of the central flange 690 forms the sealing surface between the filter frame 180 and the holding frame 116.

The gasket 600 may be formed as described above with reference to the gasket 300. A corner 675 of the gasket 600 is formed continuously with the adjoining sides of the gasket 600. The corner 675 of the gasket 600 may be formed to have a radius, a sharp corner, or other profile to maximize contact between the gasket 600 and the holding frame 116 for forming an airtight seal along the outer corners 349 of the filter frame 180.

In some examples the gasket 600 may sit in a channel (not shown) formed in the walls 304 of the filter frame 180. In other examples, the gasket 600 is disposed directly on the flat of the walls 304. The gasket 600 may have a width in the base portion 612, i.e., at least twice the distance 691, sufficient to prevent rolling and maintain good frictional adhesion to the walls 304 such that the gasket 600 does not slide off the walls 304 when installing the filter frame 180 into the holding frame 116. Advantageously, gasket 600 can be adapted to existing filter frames while providing a good seal between the filter frames and holding frames.

Figure 7:
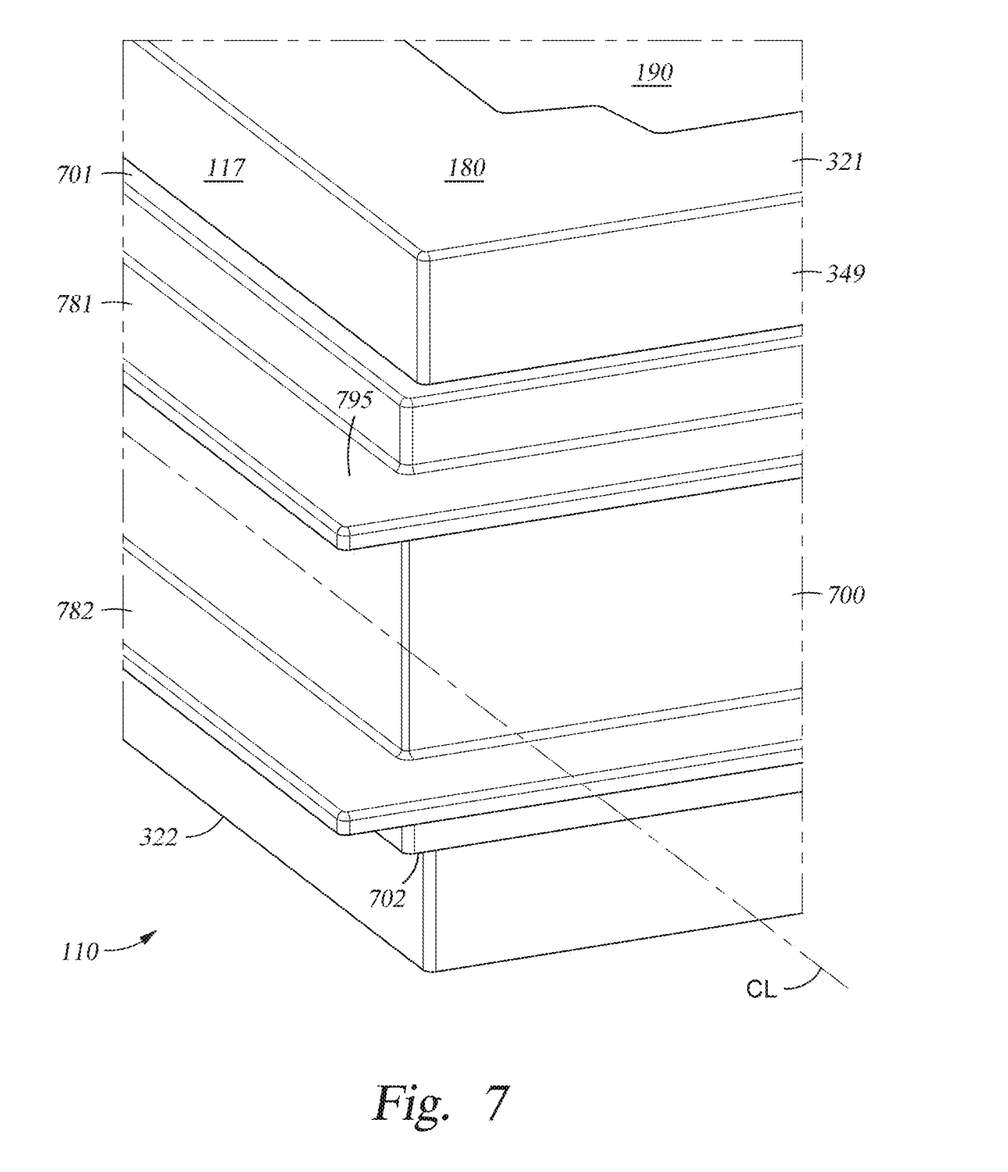
FIG. 7 is a cross-sectional view of another example for the gasket shown in FIG. 6A.

As discussed above, optional channel 253 may be disposed on the outer perimeter 342 of the filter frame 180 for locking the gasket 700 to the filter fame 180 and preventing it from sliding while being the filter frame 180 is installed in the holding frame 116. In one example, the channel 253 may be configured to fit the base portion 612 of the gasket 700. In another example, the channel 253 may be configured to fit a protrusion extending inward from the base portion 612 of the gasket 700.

FIG. 7 illustrates an orthogonal view of another example gasket 700 that may be utilized in place of the gasket 600 shown in FIG. 6A. The gasket 700 is substantially similar to gasket 600 with the exception of the replacement of the central flange 690 with a plurality of flanges. In the example depicted in FIG. 7, the gasket 700 includes a first flange 781 and a second flange 782. The gasket 700 may alternatively include additional flanges similar to the flanges 781, 782. The first flange 781 is substantially similar to the second flange 782. The first flange 781 and second flange 782 have corner 795 that may be formed at a radius or a 90° angle. The corner 795 is shaped in a manner to provide a good seal between the outer corner 349 of the filter frame 180 and the holding frame 116. Advantageously, the first flange 781 and the second flange 782 provide a redundancy in the seal to prevent leaks or bypass of air in the gasket 700. Additionally, the first flange 781 and second flange 782 balance the gasket 700 to further minimize rolling or movement of the gasket 700 when the filter frame 180 is installed in the holding frame 116. Furthermore, the multiple flanges 781, 782 advantageously increases the frictional holding force that retains the air filter 110 within the holding frame 116.

Figure 8A:
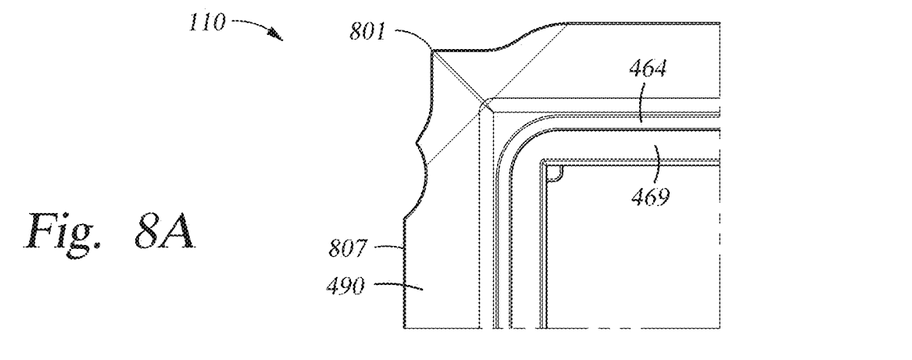
FIG. 8A is a top plan view of a portion of another example of the gasket shown in FIG. 4F.
Figure 8B:
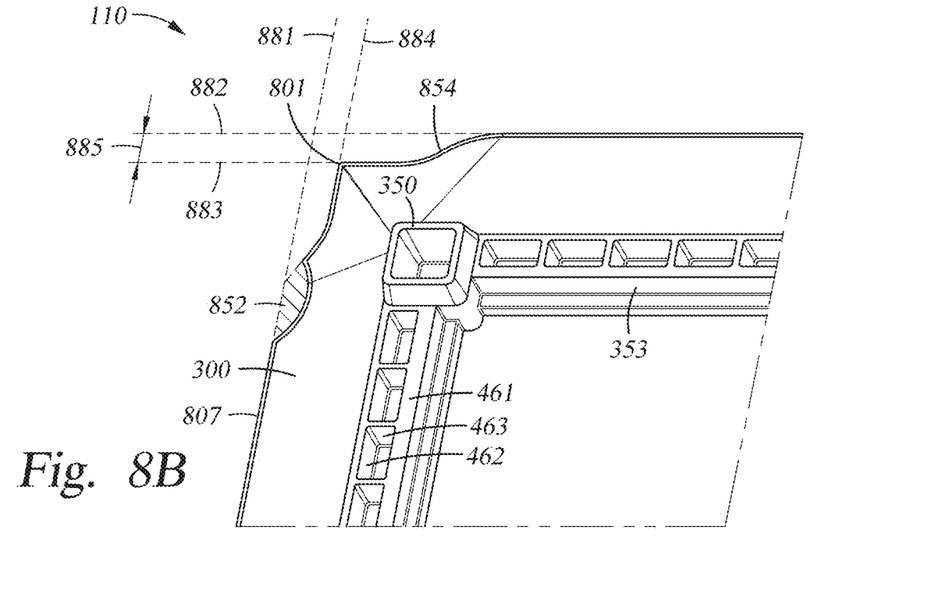
FIG. 8B is a bottom perspective view of the gasket shown in FIG. 8A.
Figure 8C:
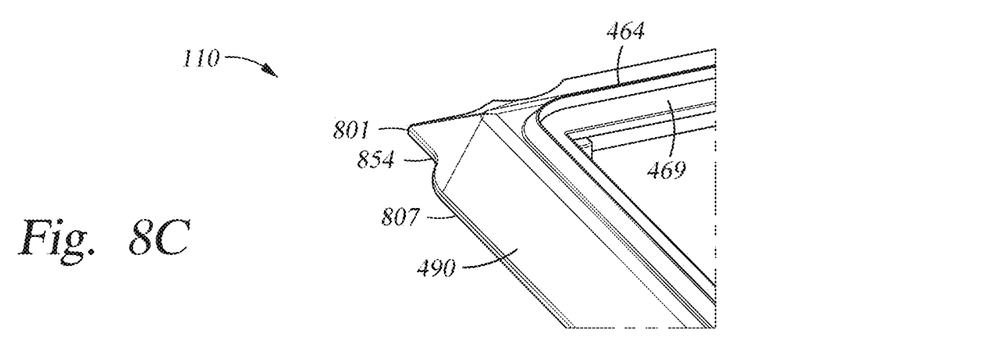
FIG. 8C is a top perspective view of the gasket of FIG. 8A.

FIG. 8A is a top plan view of a portion of another example of the gasket 800 shown in FIG. 4F. The gasket 800 is similar to gasket 300 shown in FIGS. 3A-3D. The flange 490 of the gasket 800 has cutaways 854 at a corner 801 of the gasket. The flange 490 has cutaways 854 adjacent to each side of each corner 801. The gasket 800 has a cross-sectional profile illustrated in FIG. 4F and additionally has a uniquely different corner profile on the flange 490 as shown in FIGS. 8A-8C. However, it should be appreciated that may be configured in a number of different profiles, some of which were described with reference to FIGS. 4A through 4F. For clarity of understanding, FIG. 8A will be discussed in conjunction with FIG. 8C. FIG. 8C is a top perspective view of the gasket of FIG. 8A.

The gasket 800, similar to gasket 300, is formed in a continuous rectangular ring shape body 460 from an elastomeric material. The gasket 800 is suitable for use with the filter frame 180 of the air filter 110. In one example, the inner perimeter 345 of the gasket 300 is at least 1200 mm. In another example, the gasket 300 is formed from an elastomeric material permitting the inner perimeter 345 of the gasket 300 to expand to at least 1200 mm.

The gasket 800 has a top surface 351, outer perimeter 343, inner perimeter 345 and bottom surface 352 similar to gasket 300. The flange 490 extends outwardly from the body 460 forming the outer perimeter 343. An outer edge 807 of the flange 490 extends along the outer perimeter 343. When installed to the filter frame 180, the inner perimeter 345 faces the filter media 190, while the outer perimeter 343 extends beyond the outer perimeter 342 of the holding frame 116. The body 460 has the protrusion 464 extending from the top surface 351 at or near the flange 490.

The corners 801 are illustrated in the figures with lines where the top surface 351 of the gasket 800 changes direction. However, it should be understood that the line is not a seam but a change in angle at the corners 801. That is, the flanges 490 are continuous of homogenous material and not welded, glued or otherwise seamed together in the corners 801.

FIG. 8B is a bottom perspective view of the gasket 800 shown in FIG. 8A. The flange 490 has a pair of cutaways 854 at the corners 801. The cutaways 854 are immediately adjacent the corners 801. The cutaways 854 in the flange 490 may linearly extend from the corners 801 prior to transitioning to the outer edge 807. Alternately, the cutaways 854 may extend from the corners 801 in an arc, S-curve, or other shape such that the cutaways 854 at the corner 801 has a first extension 883/884 disposed inward a distance 885 of a second extension 881/882 of the outer edges 807. The cutaways 854 permit the flange 490 of the gasket 800 to fold in the corners 801 and form a 90 degree sealing surface preventing leaks.

In one example, the gasket 800 additionally has a little cutaway 852 in the flange 490. The little cutaway 852 may provide clearance for the gasket 800 when installing in the frame. The little cutaway 852 may be disposed in one or more locations on the gasket 800. In one example, the little cutaway 852 is disposed between one of the cutaways 854 and an adjoining outer edge 807.

This has the effect of creating a longer sealing edge from one corner 801 to an adjacent corner 801. For example, the length from one corner 801 to an adjacent corner 801 is shorter than the length of the combined outer edge 807 and cutaway 854. Additionally, the cutaways 854 reduce the amount of material in the corner 801. Advantageously, the cutaways 854 in the gasket 800 prevents a fold of material in or around the corner 801 for creating a better seal while increasing the length of the seal.

The body 460 has the rectangular mating portion 353 configured to fit in the channel 253 of the filter frame 180. The gasket 800 also has a key 850 (substantially similar to key 350) formed along the bottom surface 852 and/or the inner perimeter 345. The key 850 projects into the interior region circumscribed by the gasket 800. Although the key 850 is shown as a rectangle it should be appreciated the key may be oval or any other suitable shape. A mating portion 853 (substantially similar to mating portion 353) meets at the key 850 in the corners 801 of the gasket 800.

In one example, the key 850 and the mating portion 853 have hollow portions. The key 850 and the mating portion 853 is formed in an array of elements. The outer wall 462 is connected to the inner wall 461 by the plurality of cross members 463 in the key 850. The plurality of cross members 463 may provide stiffness to the key 850 while reducing the amount of material in forming the gasket. Furthermore, the combination of cross members 463 can be sized and configured to adjust the compression of the key 850 such that key 850 is easier to install while having a better hold in mating with the recesses 310 of the filter frame 180.

The examples of the gaskets that are independent of the air filter shown and discussed above provide a number of benefits over conventional gasketted filter frames. Advantageously, the continuous nature of the gasket with the full corners and arrangement of sealing surfaces provided by the gasket offers a better seal between the filter frame and the holding frame of the air handler system. The various gaskets disclosed herein may be utilized with filter frames having complimentary mating features, and additionally conventional air filter frames. The reusability of the gasket independent of the air filter, as well as the ability to separately replace the gasket and air filter reduces overall cost of maintaining the air handling system.

In another embodiment, the removable gasket is disposed on the holding frame. The gasket mates with the holding frame. The holding frame gasket has a rectangular ring shaped body. The rectangular ring shaped body has an inner perimeter and an outer perimeter. A channel may be formed in the inner perimeter to hold the gasket. The channel may have one or more slots for configured to accept an aperture of the gasket. The rectangular gasket has an inner surface and an outer surface along a periphery of the gasket and opposite the inner surface. The gasket has corners wherein the corners are homogenously fully formed without a seam or weld. A first flange extends inwards from the inner surface of the rectangular ring shaped body extending continuously along an entire length of the body. The first flange has fully formed corners similar to discussed above for forming a seal with the filter frame. The gasket provides a seal for the air filter frame inserted therein.

While the foregoing is directed to embodiments of the invention, other and further embodiments of the invention may be devised without departing from the basic scope thereof, and the scope thereof is determined by the claims that follow.

The invention claimed is:

1. A replaceable air filter frame gasket, comprising:
    a rectangular ring shaped body having a top surface, a bottom surface, an inner wall, and an outer wall;
    an inner perimeter;
    an outer perimeter having a first corner;
    a flange extending outward to the outer perimeter from the outer wall of the body along the outer perimeter, wherein the flange has a first cutaway at the first corner extending from the first corner to a first outer edge of the outer perimeter and a second cutaway extending from the first corner to a second outer edge of the outer perimeter;
    a protrusion extending upward from the top surface; and
    a mating portion extending along the bottom surface of the body.

2. The replaceable air filter frame gasket of claim 1 further comprising:
    a rib extending from the flange in a direction of the mating portion.

3. The replaceable air filter frame gasket of claim 1, wherein the first corner of the outer perimeter is disposed a first distance inward from the first outer edge and a second distance inward from the second outer edge.

4. The replaceable air filter frame gasket of claim 3, wherein the first cutaway and the second cutaway is adjacent to each side of the first corner of the flange.

5. The replaceable air filter frame gasket of claim 1, further comprising:
    a key extending from the bottom surface, the key disposed proximate the first corner of the rectangular ring shaped body.

6. The replaceable air filter frame gasket of claim 5, wherein the mating portion and the key have a different cross-section profile and the key has a larger cross-sectional profile than the mating portion.

7. The replaceable air filter frame gasket of claim 1, wherein the protrusion extends away from the top surface at an angle towards the inner perimeter.

8. The replaceable air filter frame gasket of claim 7, wherein the angle of the protrusion is between about 90 degrees and about 30 degrees.

9. The replaceable air filter frame gasket of claim 1, further comprising:
a cutaway disposed in the flange.

10. An air filter comprising:
a rectangular filter frame having frame corners;
filter media disposed in the filter frame; and
the replaceable air filter frame gasket of claim 1 elastically secured to and extend outward of an outer perimeter of the filter frame.

11. The filter frame of claim 10, wherein the rectangular filter frame further comprises:
a body wherein a downstream surface of the body has a channel and a recess.

12. The filter frame of claim 11, wherein replaceable air filter frame gasket further comprises:
a key configured to fit in the recess, wherein a horizontal profile of the key is shaped differently than that of the mating portion and the key does not fit in the channel.

13. The filter frame of claim 12, wherein the rectangular ring shaped body has an enclosed hollow interior.

14. The filter frame of claim 12, wherein the flange further comprises:
a second corner having a third cutaway and a fourth cutaway;
a third corner having a fifth cutaway and a sixth cutaway; and
a fourth corner having a seventh cutaway and an eighth cutaway.

15. The filter frame of claim 14, wherein each of the first through eighth cutaway is of substantially similar shape and size.

* * * * *